No. 851,622. PATENTED APR. 23, 1907.
J. B. FARRAR.
COTTON CHOPPER AND CULTIVATOR.
APPLICATION FILED FEB. 20, 1907.
4 SHEETS—SHEET 1.
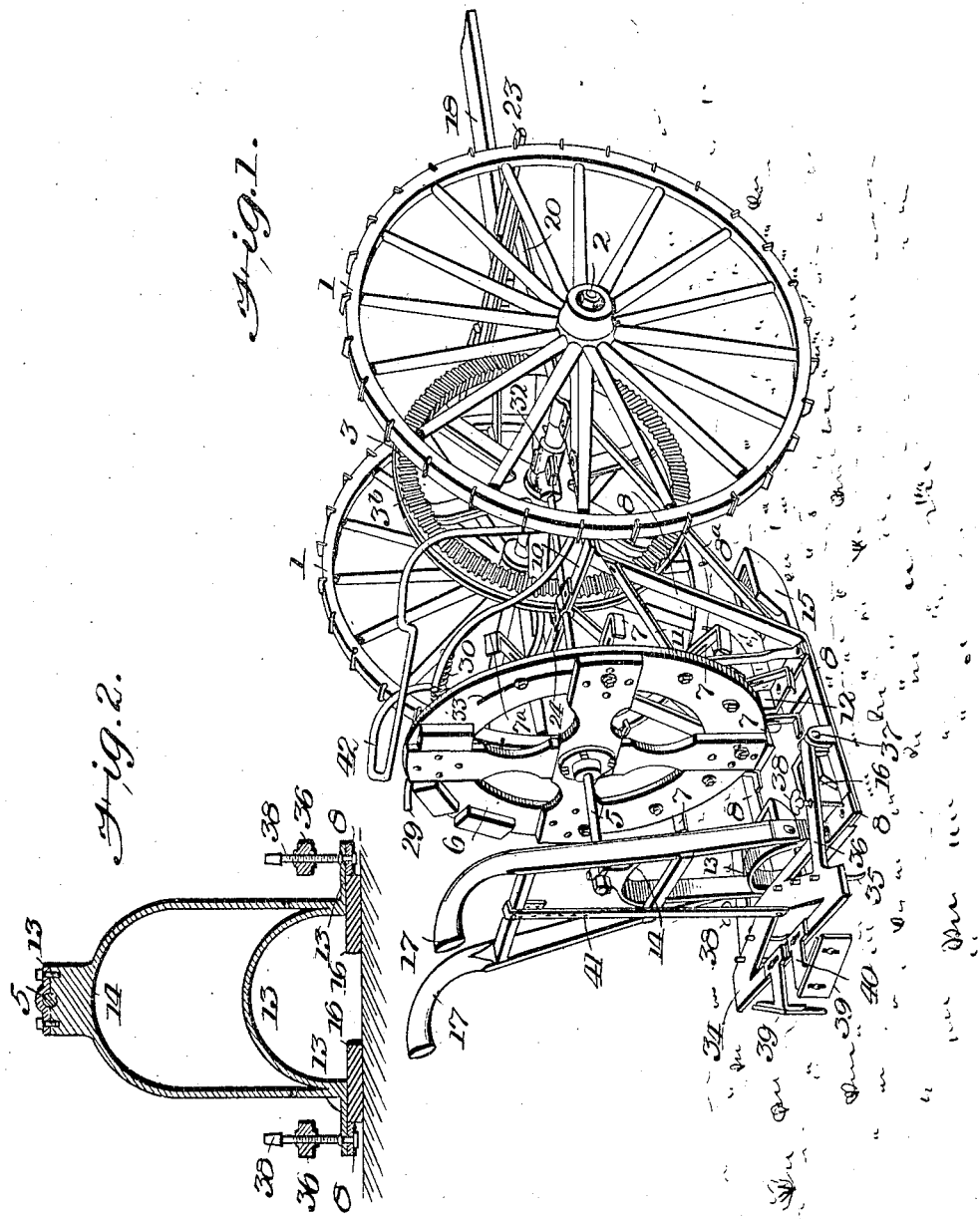
WITNESSES
INVENTOR
JAMES B. FARRAR
BY
ATTORNEYS No. 851,622. PATENTED APR. 23, 1907.
J. B. FARRAR.
COTTON CHOPPER AND CULTIVATOR.
APPLICATION FILED FEB. 20, 1907.

4 SHEETS—SHEET 2.

Fig. 3.
Fig. 3ª.

WITNESSES

INVENTOR
JAMES B. FARRAR
BY Munn & Co.
ATTORNEYS

No. 851,622. PATENTED APR. 23, 1907.
J. B. FARRAR.
COTTON CHOPPER AND CULTIVATOR.
APPLICATION FILED FEB. 20, 1907.
4 SHEETS—SHEET 3.

WITNESSES
INVENTOR
JAMES B. FARRAR
BY
ATTORNEYS

No. 851,622. PATENTED APR. 23, 1907.
J. B. FARRAR.
COTTON CHOPPER AND CULTIVATOR.
APPLICATION FILED FEB. 20, 1907.
4 SHEETS—SHEET 4.

WITNESSES
F. C. Barry
Amos W. Hart

INVENTOR
JAMES B. FARRAR
BY Munn & Co
ATTORNEYS

UNITED STATES PATENT OFFICE.

JAMES B. FARRAR, OF WILMINGTON, NORTH CAROLINA.

COTTON CHOPPER AND CULTIVATOR.

No. 851,622.        Specification of Letters Patent.        Patented April 23, 1907.

Application filed February 20, 1907. Serial No. 358,380.

*To all whom it may concern:*

Be it known that I, JAMES B. FARRAR, a citizen of the United States, and a resident of Wilmington, in the county of New Hanover and State of North Carolina, have invented an Improved Cotton Chopper and Cultivator, of which the following is a specification.

My invention is an improvement in the class of cotton-choppers in which a disk, or wheel, provided with knives is rotated for cutting out and thus spacing the planted cotton.

I have devised improvements in the chopper proper and in attachments for breaking or pulverizing the earth about the roots of the plants.

Figure 4:
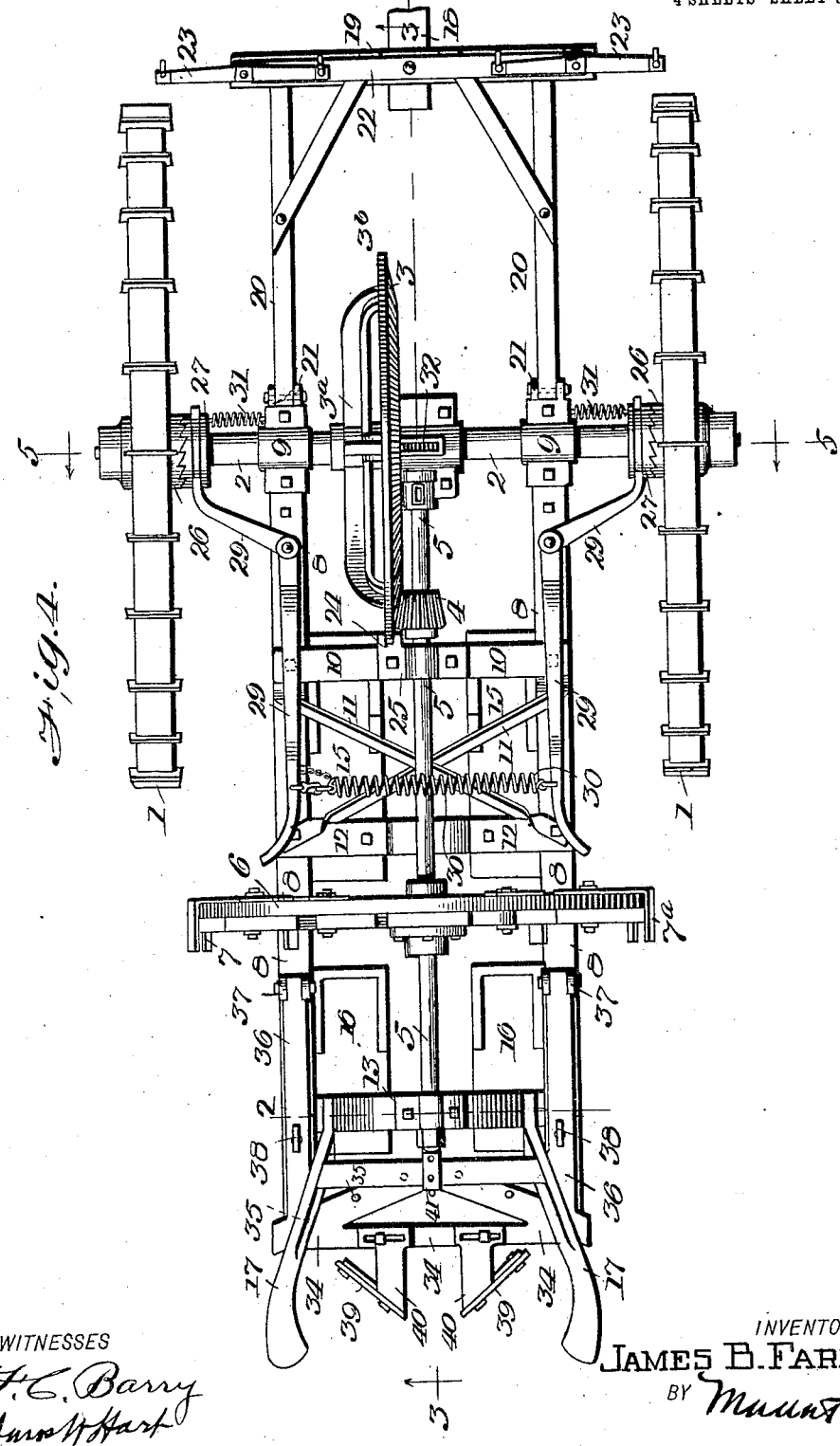
Figure 5:
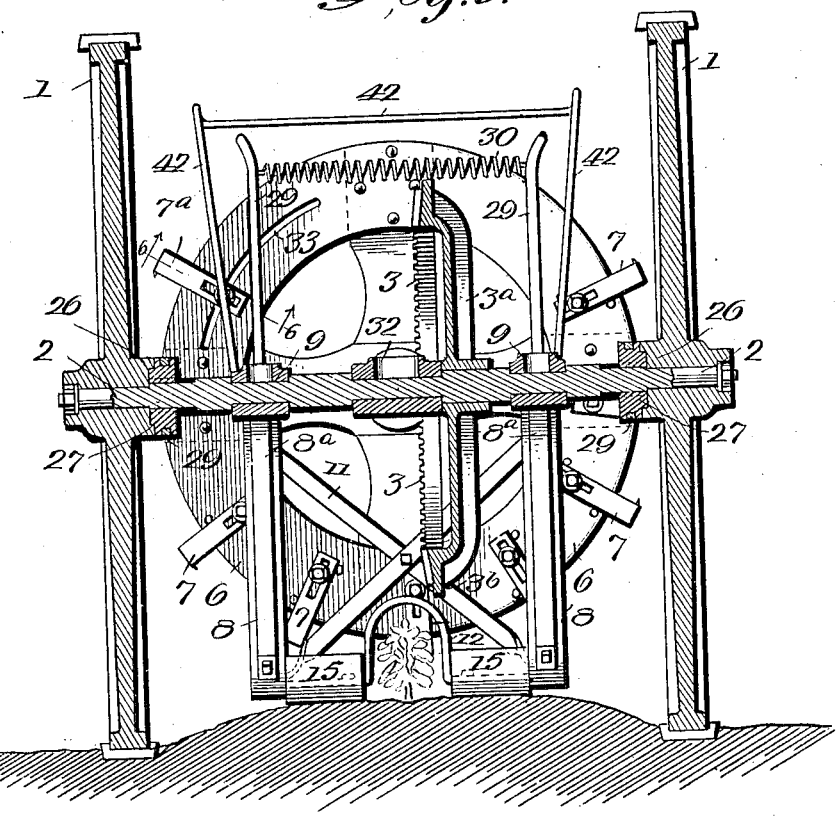
Figure 6:
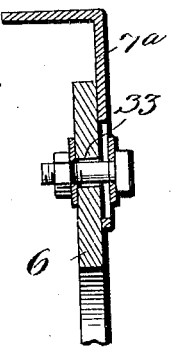
Figure 7:
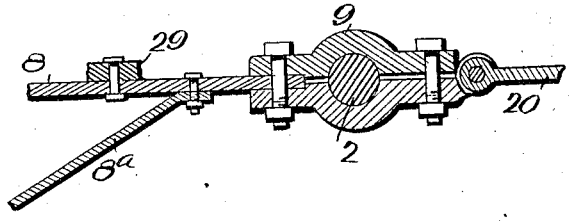
Figure 8:

The details of construction, arrangement, and operation of parts are as hereinafter described and illustrated in the accompanying drawings, in which Figure 1 is a perspective view of my improved machine. Fig. 2 is a transverse section on the line 2—2 of Fig. 4. Fig. 3 is a central longitudinal section on the line 3—3 of Fig. 4. Fig. 3ª shows a shearing blade hereinafter described. Fig. 4 is a plan view of the machine, the rein support being omitted. Fig. 5 is a transverse vertical section on the line 5—5 of Fig. 4. Fig. 6 is a detail section taken through the peripheral portion of the rotary cutter. Fig. 7 is a longitudinal section of a portion of the frame in which the rotary cutter is carried, showing the attachment of the same to the axle of the machine. Fig. 8 is a plan view of the axle separated from other parts.

Running wheels 1 are mounted loose on an axle 2—shown separate or detached in Fig. 8—but may be locked with the axle by clutch mechanism which will be presently described. A toothed drive wheel 3 is fast on the central portion of the axle, and engages a pinion 4—see Figs. 3 and 4—keyed on a shaft 5 extending rearward from the axle and arranged at a right angle thereto. Upon the said shaft 5 is keyed a cutting wheel 6 whose body as shown in Fig. 1, is formed of a flat annular peripheral portion and a series of flat radial spokes. The wheel may, however, be constructed as a solid disk, this being an immaterial feature. Cutters 7 and 7ª are attached to the rim of the wheel 6 and as the latter rotates they cut out the row of cotton plants as required. The shaft 5 is provided with bearings in a frame or attachments thereof, which will now be described. The said frame comprises parallel longitudinal bars 8, each being bent twice at an obtuse angle duly spaced apart, their front ends being detachably connected with bearings 9— see Figs. 1 and 4—applied loosely to the axle 2. Diagonal braces 8ª—see Figs. 1 and 3— extend beneath said bars from their lower angles to the front portions thereof—see also Fig. 7. The frame further comprises a series of cross bars 10, 11, 12, 13 and 14—for the last two bars see Figs. 1 and 2. The first and forward cross bar 10 is attached to the longitudinal bars 8 at the first or upper obtuse angle thereof; the bars 11 are arranged diagonally and applied to the downwardly extended portions of the longitudinal bars 8. The cross bars 12 and 13 have a central arch, as indicated in Figs. 1, 2 and 4, to allow passage of cotton plants. The bar 14 is an arch extended upward, and the shaft 5 of the cutting wheel 6 has its bearings in the first cross bar 10 and the rear arch 14.

It will be seen that the frame thus constructed, together with the cutting wheel supporting and journaled therein, is free to swing vertically on the axle 2. For supporting this upon the ground, I provide two sets of runners which may be conveniently termed shoes, the same being indicated by numerals 15 and 16—see Figs. 3 and 4. The forward shoes 15 are curved upward at their front ends and attached to the under side of the longitudinal bars 8 and to the cross bar 12, while the rear shoes 16 are similarly curved and attached to the rear ends of the longitudinal bars 8 and to the rear cross bar 13.

It will be seen that the front shoes 15 and rear shoes 16 are spaced apart sufficiently to accommodate the row of cotton plants, or in other words to allow the same to pass between them.

The shoes may be constructed of any suitable material, as wood or metal, the latter being preferred. When constructed of metal, they may be formed by stamping up plates thereof in the required shape. Handles 17 are attached to the sides of the arch 14 and serve as guides for the shoes and the revolving cutter, as may be required by any lateral deflection of the cotton row or other condition; the handles also serve as means for lifting and adjusting the shoes and cutting wheel when turning at the end of a cotton row. A pole or tongue 18 is attached to a cross bar 19—see Figs. 1 and 4—and parallel bars 20 extend from the cross bar back to the bearings 9 to which they are jointed at 21 as shown. A draft attachment comprising a doubletree 22 and swingletrees 23 is applied to said cross bar in a manner which will be readily understood. Thus the draft on the machine is applied by the team entirely to the axle 2 and the chopping and other mechanism follow the axle but are free for vertical adjustment thereon. The toothed drive wheel 3 is slightly beveled—see Fig. 4—its annular rim being supported by curved spokes $3^a$ and the wheel having a flange $3^b$ extended beyond the teeth, and the same running in a slot 24 formed in a plate 25 that forms the top of the boxing for shaft 5 that is secured to the upper cross bar 10. It is obvious that by this construction the toothed peripheral portion of the drive wheel is held in firm engagement with the pinion 4 on the shaft 5, and it is obvious I am thus enabled to construct the drive wheel lighter than would be otherwise practicable.

I provide a clutch mechanism for locking the running wheels 1 with the axle when it is required to drive the cutter 6. Thus the inner ends of the hubs of said wheels are provided with a half clutch 26 and a corresponding clutch 27 is adapted to engage the same and to slide on the axle 2, the latter having longitudinal grooves 28 as indicated in Fig. 8 to receive a feather with which the half clutches 27 are provided. Elbow shaped levers or release handles 29—see Fig. 4—are pivoted at their angles to the longitudinal bars 8, their forward ends engaging the half clutches 27, and their rear arms extended near to the cutting wheel 6. A spiral spring 30 connects the rear arms of the levers or handles detachably, and when engaged therewith as shown in Fig. 4, holds the clutches engaged or locked together, so that the wheels 1, the axle 2, the driving gear 3, and the cutter shaft and wheel rotate together. By detaching one end of the spring from one of the levers 29, the clutches 27 are released and will be retracted by small spiral springs 31, the same being arranged as shown in Fig. 4. When the clutches are thus disengaged, it is obvious the wheels 1 will rotate free on the axle 2, without imparting rotation to the cutting wheel. Shoes 15 and 16 will, however, at such time travel on the ground the same as before, so that the machine may be hauled from field to field, or from place to place, as required.

As shown in Fig. 3, the forward end of the drive-wheel shaft 5 is provided with an enlarged radial flange or collar $5^a$, and thus held rotatably in a bearing 32 which is mounted loose on the central portion of the axle. This bearing 32 and the bearings 9— see Figs. 5 and 7—are formed of two parts secured together by screw bolts as shown. As indicated in Fig. 8, the axle 2 is provided with a series of collars and intervening reduced portions, and it is between such collars that the three bearings are applied. The outer reduced portions serve to receive the half clutches 27. By this means, the several bearings are held duly spaced apart.

The cutters proper 7, $7^a$, attached to the peripheral portion of the wheel 6, are constructed in right angular form. That is to say, the cutter proper is parallel to the periphery of the wheel, while their shanks are slotted longitudinally and secured radially to the flat rim of the wheel by means of screw bolts. The longitudinal slots adapt the cutters to be adjusted radially, or outward and inward, as required to enable them to cut at the right depth, and it will be seen that the arrangement of the shanks of the cutters edgewise to the row of plants, enables them to pass through with little resistance, while the blades or cutters proper make the cut adjacent thereto. It is sometimes desirable to vary the width of the chops or cuts made in the row, according as the stand is good or bad, and for this purpose the cutter $7^a$ is adapted for adjustment on the wheel proper 6 in a manner different from the others. That is to say, the wheel is provided with an arc slot 33—see Fig. 1— in which the bolt that secures the cutter $7^a$ is arranged. Consequently, said cutter may be adjusted around the periphery of the wheel as required to reduce or increase the width of the cuts in the row of cotton plants.

I provide the chopper with a cultivating attachment whose construction and operation are as follows. A cross bar or frame 34 is provided with teeth 35 and arranged directly in rear of the rear shoes 16, arms or levers 36 extending forward and being hinged at 37 to the longitudinal bars 8 of the cutter and shoe frame. Thus, this cultivating device is adapted to follow directly in rear of the chopping machine proper and to rise and fall by its own weight. It may therefore be used to cultivate and loosen the soil as required. When the condition of the soil is such as not to require it, it may be easily detached. For regulating the depth at which the teeth 35 may work in the soil, I provide set screws 38—see Fig. 2—the same passing through the bars 36 and bearing upon the rear cross bar 13. To the rear portion of the cross bar 34 are attached plates 39 that serve as scrapers and for throwing the loosened earth toward the cotton plants. Such plates are provided with vertical slots and are secured by bolts to angular brackets 40 which are in turn secured adjustably to the bar 34 by means of bolts passing through slots. Thus the depth at which the plates 39 shall work, and the distance between them, may be regulated at will. The cultivating attachment may be suspended out of action by means of a strap 41.

The lines or reins used for guiding the team may be supported above the cutting wheel by a device 42—see Figs. 1, 3 and 5—the same being formed of a metal rod whose ends are secured to the longitudinal frame bars 8, and the body curved forward and rearward as shown.

The operation of my machine is as follows. It will be understood that the horses or mules composing the team walk in adjoining furrows between the cotton rows, and that the wheels 1 follow, and thus the lowest point of the cutting disk 6 is brought directly over the cotton plants, and the shoes run on the ridge as shown in Fig. 5, the curves or arches of the cross bars 12 and 13 permitting their passage as will be readily understood. The clutches being engaged, the rotation of the wheels is imparted to the axle and from that through the gearing 3, 4, to the shaft 5, and consequently the cutter is caused to rotate; but owing to the advance of the machine, the cutters come in contact with the cotton row at intervals and thus cut out spaces which are equidistant from each other. By adjustment of the blade or cutter 7ª, the length of the portion thus cut out, or the number of stalks left standing in a bunch, may be varied as required. The adaptation of the framework in which the cutter is supported and journaled for vertical play or adjustment, enables it to pass over inequalities or differences in elevation in the height of the ridge in which the cotton grows, but the cutters always act on the row at the proper depth.

In some cases the soil is lumpy or uneven because not properly prepared, and it is expedient to level or shave the same in advance of the cutter. In such case the forward shoes 15 may be detached and scrapers or shavers 43 may be applied in their place, as shown in Fig. 3ª. The same consist of metal plates whose forward ends are flanged and extend laterally at a considerable angle.

What I claim is:

1. The improved cotton cultivator comprising an axle and running wheels and clutches for locking them together, a gear fixed on the axle, a frame projecting rearward and hung loosely on the axle so as to oscillate vertically, a shaft journaled in supports forming a part or attachment of said frame, and having a pinion meshing with said gear, and, a cutting wheel mounted on said shaft, and provided with cutters extended from its periphery, and shoes forming an attachment of the cutter-carrying frame, substantially as described.

2. The combination with running wheels and an axle having a series of alternating collars and reduced portions, a rearwardly extended frame and bearings to which it is detachably connected, said bearings being composed of separable parts adapted for application to the reduced portions of the axle, shoes or runners applied to the rear lower portion of the said frame, a cutter wheel and its shaft supported and journaled in said frame, and having a front bearing which is also loosely and detachably applied to a reduced portion of the axle, and gearing for driving the cutter, as shown and described.

3. The improved cotton cultivator comprising an axle and running wheels, a revolving cutter and cutter shaft, and means for driving the latter, a rearwardly extended frame in which the cutter shaft is journaled, the lower rear portion of said frame being provided with shoes bearing on the ground, as shown and described.

4. The combination with an axle and wheels mounted thereon, of a frame extended rearwardly and downwardly and provided with runners, a cutter wheel and a shaft carrying the same and gearing connected with the axle for rotating said wheel, the latter having a series of cutters extended peripherally, all secured at fixed points to the rim of the wheel, save one, which is adjustable around the rim, the latter having an arc slot and a screw bolt passing through the same and securing the adjustable cutter as specified.

JAMES B. FARRAR.

Witnesses:
SOLON C. KEMON,
AMOS W. HART.